(12) United States Patent  
Newman et al.

(10) Patent No.: US 7,604,748 B2
(45) Date of Patent: Oct. 20, 2009

(54) MAGNETIC FILTER

(75) Inventors: Keith Newman, Chesterfield (GB); Kevin Martin, Treeton (GB); Steve McAllorum, Rossington (GB); Steve Mott, Dinnington (GB)

(73) Assignee: Eclipse Magnetics Limited, Sheffield (GB)

( * ) Notice: Subject to any disclaimer, the term of this patent is extended or adjusted under 35 U.S.C. 154(b) by 721 days.

(21) Appl. No.: 11/254,952

(22) Filed: Oct. 20, 2005

(65) Prior Publication Data

US 2007/0090055 A1    Apr. 26, 2007

(51) Int. Cl.
*C02F 1/48* (2006.01)

(52) U.S. Cl. .............................. 210/695; 210/222
(58) Field of Classification Search .............. 210/222, 210/223, 695
See application file for complete search history.

(56) References Cited

U.S. PATENT DOCUMENTS 3,402,820 A * 9/1968 Lohmann .................... 210/222
4,519,906 A    5/1985 Hikosaka et al.
5,089,128 A    2/1992 Garaschenko et al.
5,348,050 A * 9/1994 Ashton ...................... 210/222
5,366,623 A * 11/1994 Clair .......................... 210/222

FOREIGN PATENT DOCUMENTS

| EP | 0873774 | 10/1998 |
| GB | 1129516 | 10/1968 |
| GB | 2361441 | 10/2001 |

* cited by examiner

*Primary Examiner*—David A Reifsnyder
(74) *Attorney, Agent, or Firm*—Wiggin and Dana LLP; Gregory S. Rosenblatt

(57) ABSTRACT

A magnetic filter device capable of separating contaminant material from a working fluid. The device includes an inlet to allow fluid to flow into the device and an outlet to allow fluid to flow out of the device. The filter further includes an elongate magnetic core comprising at least four columns of magnets. At least two magnetic columns include a north polarity extending over the length of the columns and at least two columns have a south polarity extending substantially the length of the columns. The four columns are positioned lengthways around a central longitudinal axis of the core in alternating north and south polarity thereby generating a magnetic field of alternating high and low field intensity in the region around the magnetic core exterior.

28 Claims, 10 Drawing Sheets

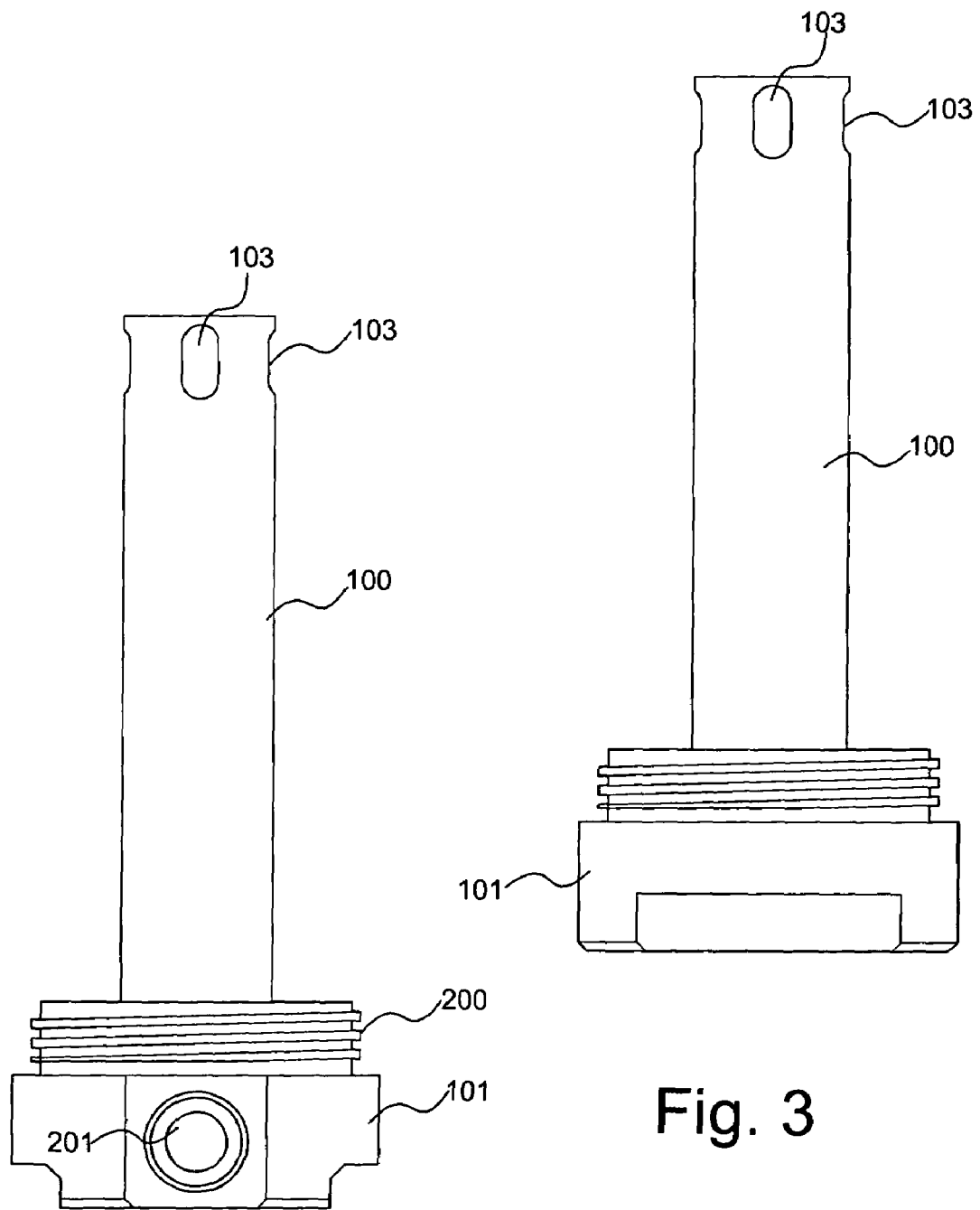

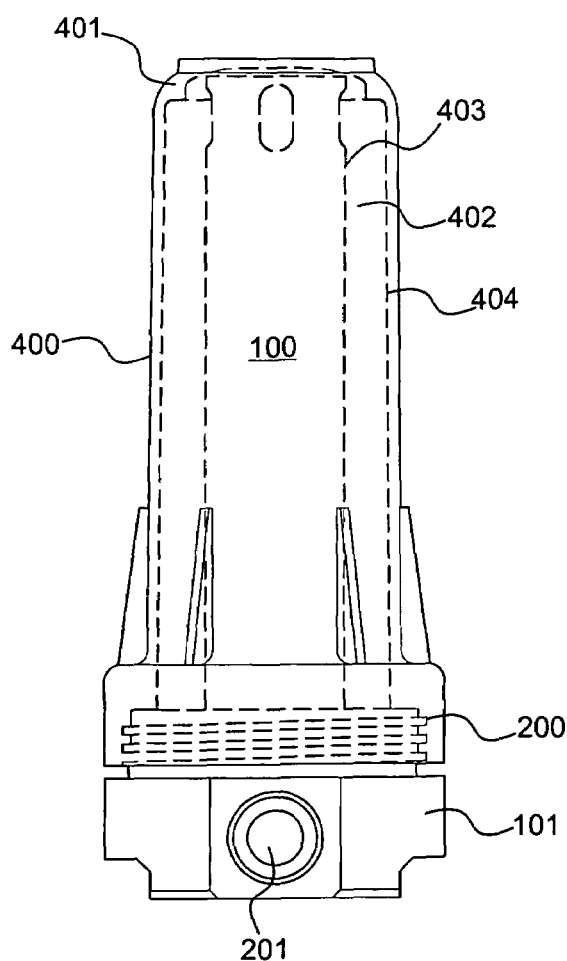
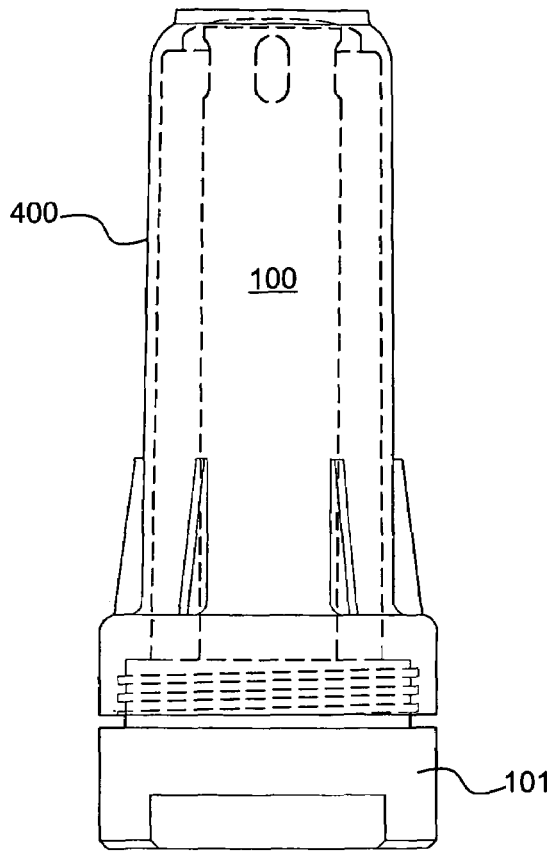
Fig. 4
Fig. 5

MAGNETIC FILTER

FIELD OF THE INVENTION

The present invention relates to magnet filters configured to separate contaminant material from a fluid.

BACKGROUND TO THE INVENTION

Most industrial applications that utilise a working fluid to provide cooling or lubrication for example, require fluid filtration devices which serve to maintain the quality of the fluid by removing solid contaminant material. If filter elements were not employed the resulting heavily contaminated fluid would no longer flow freely resulting in excessive machine wear and ultimately machine failure. Moreover, certain types of contaminant material, in particular metal particles, can act to catalyse unwanted chemical reactions within the machinery whereby the working fluid effectively becomes increasingly corrosive.

A number of categories of fluid filtration devices have been proposed capable of filtering mediums such as oil, water or other natural or synthetic liquids.

A first type of fluid filter that is widely used in vehicles, aircraft and industrial machinery removes microparticles from the fluid via a permeable membrane typically being conventional filter paper. The fluid passes through the paper medium whereby the microparticles are deposited on the paper as the fluid passes through it. However, such filters are disadvantages as the replaceable filter cartridges contribute to maintenance costs and present waste disposal problems.

Magnet filters have emerged as a suitable alternative to paper filters and function to separate particulate impurities via the magnetic flux generated by a magnetic core within the filter.

Conventional magnetic filters typically have an outer case surrounding an inner magnetic core. The fluid to be filtered, flows between this outer case and the magnetic core such that contaminant material is attracted and deposited on the outer surface of the core.

GB 1129516 discloses a magnetic filter having an inner magnetic core comprising a series of coaxial discs of a soft ferromagnetic material. Each disc is positioned between coaxial discs of permanent magnets forming a cylindrical magnetic core. So as to prevent separated contaminant material from being removed from the magnetic core by the passing fluid and to extend the depth of field created by the magnets, the annular ferromagnetic spacers have a greater radius than the permanent magnets so as to form a ribbed column. As the contaminated fluid flows over the magnetic core, the contaminant is attracted by the magnets and trapped between the ribs formed by the annular ferromagnetic extensions which serve to prevent the passing fluid removing the contaminant from the magnetic core given the relatively weak magnetic field employed.

EP 0873774 similarly discloses a paperless magnetic filter comprising a column of coaxial magnetic discs. Positioned between each magnetic disc are supporting structures and yokes which are of larger radius than the magnets creating the ribbed structure. The magnets are arranged such that neighboring magnets in the column have repelling polarity (N to N, S to S), creating a perturbed magnetic field. When the fluid flows through the magnetic field turbulence is induced and the contaminant particles are more readily separated from the fluid with regard to a non-repelling magnetic arrangement.

Whilst being beneficial over more traditional paper filters, by obviating the requirement for a replacement filter medium, a number of problems exist with conventional magnetic filters. Due to the construction of the magnetic core from disc magnets, the magnetic field created is relatively weak necessitating the annular ferromagnetic extensions which both extend the magnetic field and prevent separated contaminant from being washed-off the outer surface of the central core. Such filters are limited in that they can separate only relatively small volumes of contaminant before the filter becomes contaminant-saturated and requires cleaning. Cleaning such filters requires the fluid to be drained and the filter dismantled causing expensive operational interruptions. Additionally, as the contaminant is trapped within the profiled ribs of the column, cleaning typically comprises spray or jet washing so as to sufficiently remove the contaminant. This elaborate cleaning process in turn introduces additional operational delays.

There is therefore a need for a magnetic filter that addresses these problems.

SUMMARY OF THE INVENTION

The present invention provides an improved magnetic filter device configured to separate contaminant material from a fluid without the disadvantages associated with known filters. The magnetic core of the filter device of the present invention comprises at least four columns of magnets, each column having a single, substantially uniform polarity extending along its length. The magnets are positioned lengthways around a central longitudinal axis of the core in an alternating north and south polarity. The effect of this is the creation of a profiled magnetic field gradient perpendicular to the core axis in turn providing 'fluid flow path channels' between the outer case and the magnetic core. These flow path channels correspond to regions of low magnetic field intensity extending along the length of the column. Corresponding regions of high magnetic field intensity serve to attract contaminant material which migrates into these higher field gradient regions which creates the contaminant free channels along which the fluid may freely flow.

Through experimental testing, the inventors have proven that at full contaminant saturation level (where the magnetic core cannot attract and retain further contaminant) the flow path channels allow the fluid to continue flowing through the filter.

This magnetic flux circuit geometry, of longitudinally extending high and low field gradients, provides for a controlled deposition of contaminant on the magnetic core. Accordingly, as the magnetic filter enables the fluid flow to be maintained at the contaminant saturation point the fluid flow is never interrupted or blocked causing excessive wear and/or irreparable damage to the machinery concerned.

According to a first aspect of the present invention there is provided a magnetic filter device for separation of contaminant material from a fluid, said filter comprising: an inlet to allow a fluid to flow into said filter device; an outlet to allow said fluid to flow out of said filter device; and an elongate magnetic core comprising at least four columns of magnets, at least two said columns having a north polarity extending substantially the length of said columns and at least two said columns having a south polarity extending substantially the length of said columns wherein said at least four columns are arranged lengthways around a central longitudinal axis of said core in alternating north and south polarity.

In a preferred embodiment, the magnetic core comprises an internal passage extending substantially the length of the magnetic core whereby the four columns of magnets are arranged around this internal passage. Preferably, this internal passage is lined with magnetic keepering means configured to inhibit or deaden the magnetic field created by the magnets within the passage. The fluid flows from the inlet and into a contaminant capture zone defined by the outer surface of the magnetic core and an outer case. The fluid then flows in an opposition direction through the internal passage towards the outlet. Whilst the magnitude of the magnet field within the catchment zone is greater than that within the internal passage, due to the nature and orientation of the columns of magnets, when the outer surface of the core becomes saturated with contaminant, unseparated contaminant within the fluid would otherwise be deposited within the internal passage leading to severe flow restriction and blockage. The magnetic keepering means significantly reduces and ideally eliminates the magnetic field within the internal passage. To assist cleaning and to prevent possible filter corrosion the inner passage is further lined with a stainless steel inner sleeve extending the length of the passage.

Preferably, the columns of magnets forming the magnetic core are housed within a sleeve being preferably a stainless steel sleeve. Alternative materials for the inner and outer sleeve include austenitic stainless steel, ceramic or anodised aluminium.

In order to provide a magnetic core from which the contaminant material may be quickly and easily removed, the outer surface of the core (metal sleeve) comprises a smooth and regular finish whereby an operator may simply remove the contaminant by, for example, wiping the outer surface with a cloth or scrapping tool. According, the filter of the present invention may be cleaned quickly and easily ready for reuse.

Preferably, the filter device comprises a filter head which is manufactured from anodised aluminium. The magnetic core may be removably attached to the filter head and preferably an o-ring is positioned at the interface between the filter head and the magnetic core to eliminate unfiltered fluid bypassing the catchment zone when flowing from inlet to outlet. The o-ring further serves to physically retain the magnetic core to the filter head whilst the outer case is secured to the filter head preferably by cooperating screw threads positioned at the filter head and outer case.

Preferably, the outer case, or at least a portion of the outer case is transparent or translucent enabling a user to visually determine the required time for maintenance or cleaning of the filter by observing the amount of contaminant deposited on the magnetic core. By using a transparent outer case the need to drain down the system and remove the magnetic core from the device is avoided in turn reducing operational interruptions.

So as to provide a uniform distribution of fluid through the contaminant catchment zone between the outer surface of the magnetic core and the inner surface of the outer case, the fluid inlet may be divided into a plurality of fluid directing ports to create a plurality of fluid flow paths within the catchment zone. Existing magnetic filters typically introduce the fluid into the filter via a single inlet whereby the fluid flow path within the catchment zone is directed substantially parallel with the length of the magnetic core. The linear flow path of known magnetic filters is disadvantages as the filter very quickly becomes saturated with contaminant at the fluid inlet entry point causing restriction to flow and reduced filtration efficiency. According to one aspect of the present invention, the incoming flow path is divided within the filter head, at the entry point into the catchment zone. Preferably, the flow path is split into two tapered ports within the filter head configured to direct the inlet fluid to emerge into the catchment zone along a predetermined path such that the two inlet flow paths collide at a predetermined distance along the length of the catchment zone causing flow disruption and turbulence at and beyond the point of collision. This turbulence in the fluid flow serves to evenly distribute the deposition of contaminant over the entire magnetic core area resulting in enhanced volumes of contaminant separation, a greater saturation level and higher filtration efficiency. In particular, the plurality of inlets are configured to direct the flow of fluid into the catchment zone in a direction transverse to the longitudinal axis of the magnetic core.

Preferably the magnetic core comprises a cylindrical geometry. In the region of the magnetic core, along its length, the outer case also preferably comprises a cylindrical geometry. Moreover, the internal passage within the magnetic core may also be formed as a cylindrical tube.

To ensure optimum system filtration and to facilitate efficient maintenance of the filter, it is necessary to determine the amount of contaminant material deposited on the magnetic core. An existing technique to indirectly determine the relative amounts of contaminant material separated from the fluid is by means of flow measurement or pressure differential across the filter element. Using conventional Bourdon technology the pre-filtered pressure is compared to the post filter pressure to determine the level of contaminant captured. Due to the regions within the catchment zone of relative high and low intensity magnetic field and hence the creation of free flow paths along the length of the core a pressure differential pre and post filter is not observed and therefore contamination levels cannot be monitored via pressure monitoring. According to a specific implementation of the present invention the filter device further comprises a contaminant saturation indicator configured to be responsive to the amount of contaminant separated from the fluid and deposited on the magnetic core. Preferably, the saturation indicator comprises a spring biased magnetic plunger located at the outer case such that the position and movement of the magnetic plunger is determined by the level of magnetic attraction to the magnetic core. The magnetic field strength experienced by the magnetic plunger is affected by the amount of contaminant deposited on the magnetic core so as to provide a suitable contaminant sensor and indicator.

According to a second aspect of the present invention there is provided a method of filtering contaminant material from a fluid, said method comprising: allowing a fluid to flow into a magnetic filter via a fluid inlet; allowing said fluid to flow over an elongate magnetic core comprising at least four columns of magnets, at least two said columns having a north polarity extending substantially the length of said columns and at least two said columns having a south polarity extending substantially the length of said columns wherein said at least four columns are arranged lengthways around a central longitudinal axis of said core in alternating north and south polarity; and allowing said fluid to flow out of said magnetic filter via a fluid outlet.

According to a third aspect of the present invention there is provided a kit of parts for a magnetic filter device comprising: an elongate magnetic core comprising at least four columns of magnets, at least two said columns having a north polarity extending substantially the length of said columns and at least two said columns having a south polarity extending substantially the length of said columns wherein said at least four columns are arranged lengthways around a central longitudinal axis of said core in an alternating north and south polarity; a filter head comprising an inlet and an outlet, said filter head capable of being removably attached to said magnetic core; and an outer case configured to seat against said filter head and encase said magnetic core.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 2 is a side elevation view of the magnetic filter device of FIG. 1;

FIG. 3 is a further side elevation view of the magnetic filter device of FIG. 2;

FIG. 4 is a side elevation view of the magnetic filter device of FIG. 2 further comprising an outer case positioned over and about the magnetic core;

FIG. 5 is a further side elevation view of the magnetic filter device of FIG. 4;

DETAILED DESCRIPTION

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

Within the specification the term 'contaminant material' refers to magnetic materials and in particular diamagnetic, paramagnetic, ferromagnetic, antiferromagnetic, and ferrimagnetic materials and particulates. Additionally, the present filtration device is also capable of filtering non-magnetic materials which may be captured within the fluid medium by the magnetic material migrating towards the magnetic core of the filter device.

Figure 1:
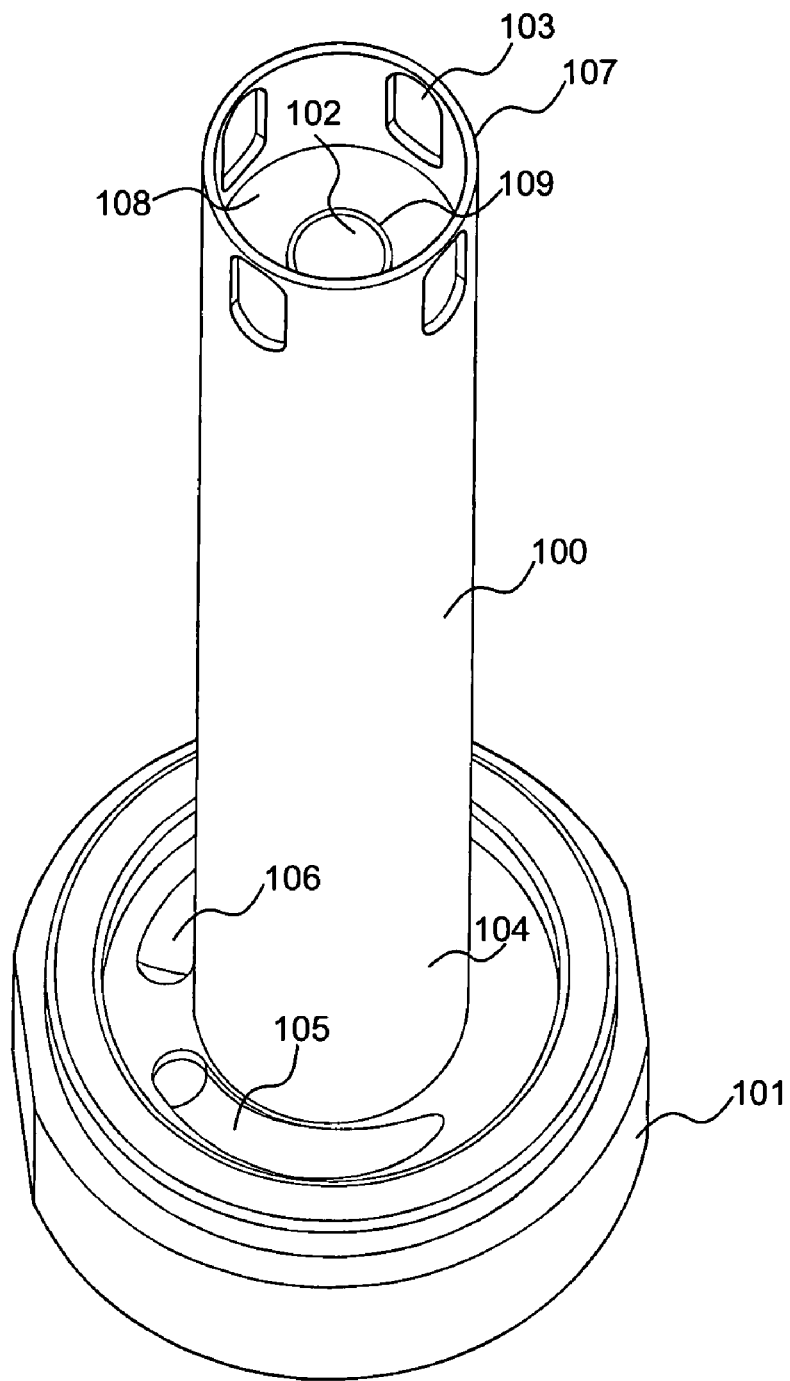
FIG. 1 is a perspective view of the magnetic filter device having a central magnetic core extending from a filter head.

The magnetic filter device comprises an elongate magnetic core 100 removably attached at one end 104 to a filter head 101 as illustrated in FIGS. 1, 2 and 3. The cylindrical magnetic core 108 is housed by a stainless steel outer sleeve 107 extending substantially the length of magnetic core 108. The outer sleeve 107 extends beyond the end of central core 108, at one end, and comprises four orifices or slots 103. The magnetic core comprises an internal passage 102 extending centrally along its axis. Internal passage 102 is defined by an internal stainless steel sleeve 109 extending the length of magnetic core 108.

Filter head 101 comprises a fluid inlet 201 which is divided into two fluid inlet directing ports 105 and 106. Screw threads 200 are also provided on a portion of filter head 101 configured to mate with corresponding screw threads of an outer case illustrated in FIGS. 4 and 5.

Outer case 400 is substantially cylindrical and comprises a greater radial cross section than magnetic core 108. Accordingly, the magnetic core is capable of positioning inside the outer case with a suitable gap region 402 extending longitudinally between an outer surface 403 of the core and an inner surface 404 of the outer case. A recess 401 is provided at one of outer case 400 into which a portion of the outer sleeve sits.

Figures 6, 7:
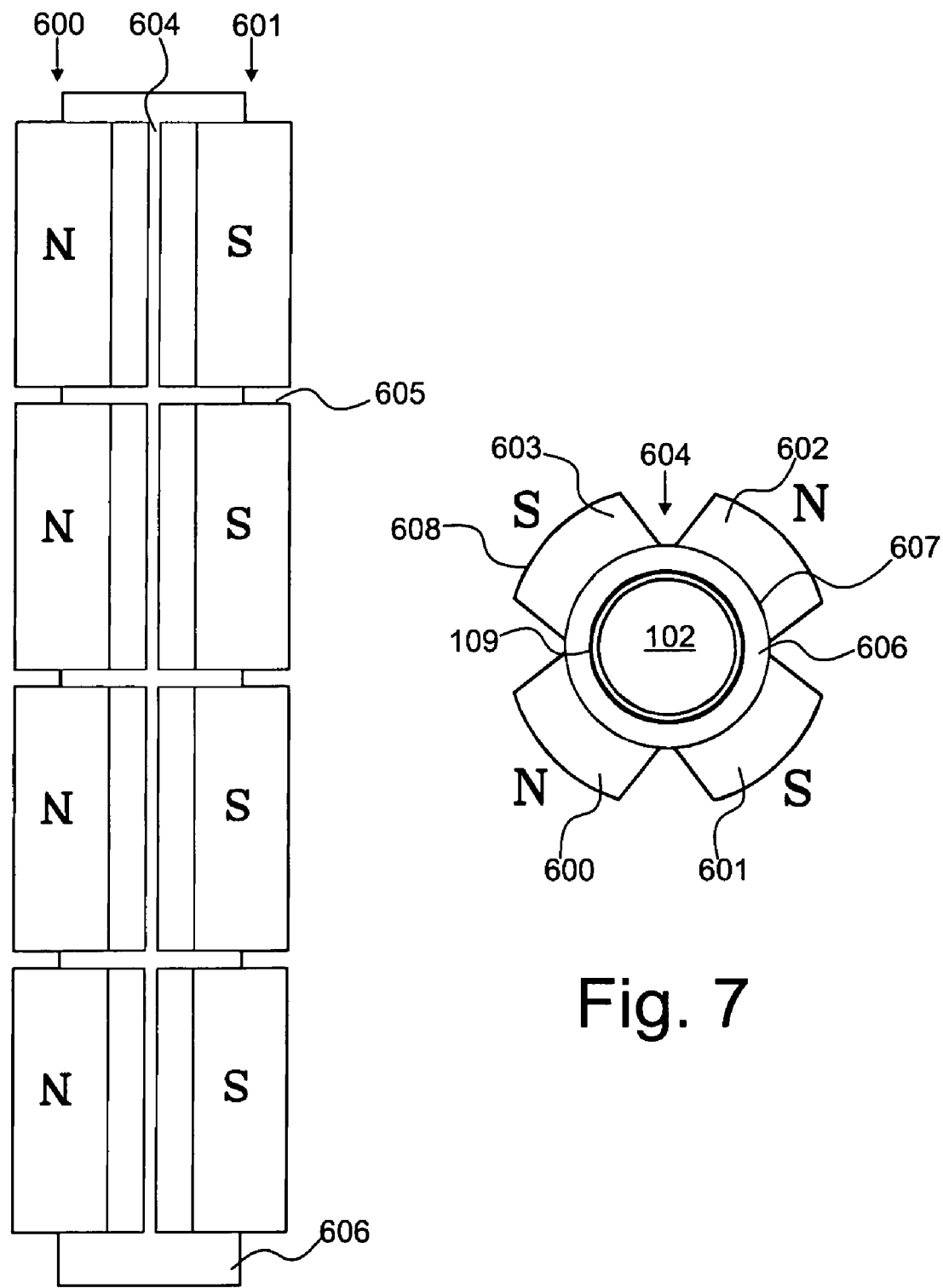
FIG. 6 is a side elevation view of the interior of the magnetic core having columns of north and south polarity magnets.
FIG. 7 is a plan view of the magnetic core of FIG. 6.

The magnetic core comprises four columns of rare earth magnets 600, 601, 602, 603 as illustrated in FIGS. 6 and 7. Each magnetic column comprises four separate magnets, each magnet of any one column having a singular corresponding polarity. For example, a first column 600 comprises four rare each magnets, each magnet having an entirely north polarity and a second column 601, each magnet positioned in this series having an entirely south polarity. Each magnet in each column is separated by an adjacent magnet in the same column by distance 605. Each element of the magnetic columns are held in position around a central cylinder 606. Each column is aligned lengthways and substantially parallel to a longitudinal axis of central column 606. Each magnet column is separated by a neighboring adjacent column by distance 604 extending lengthways between each column. So as to seat against central column 606, each magnet of each column comprises at least one curved surface 607 which is positioned against and in contact with an outer surface of the cylindrical central column 606. Additionally, an outermost surface of each magnet 608 is also curved being capable of seating against and in contact with an inner surface of the cylindrical outer sleeve 107.

Figure 8:
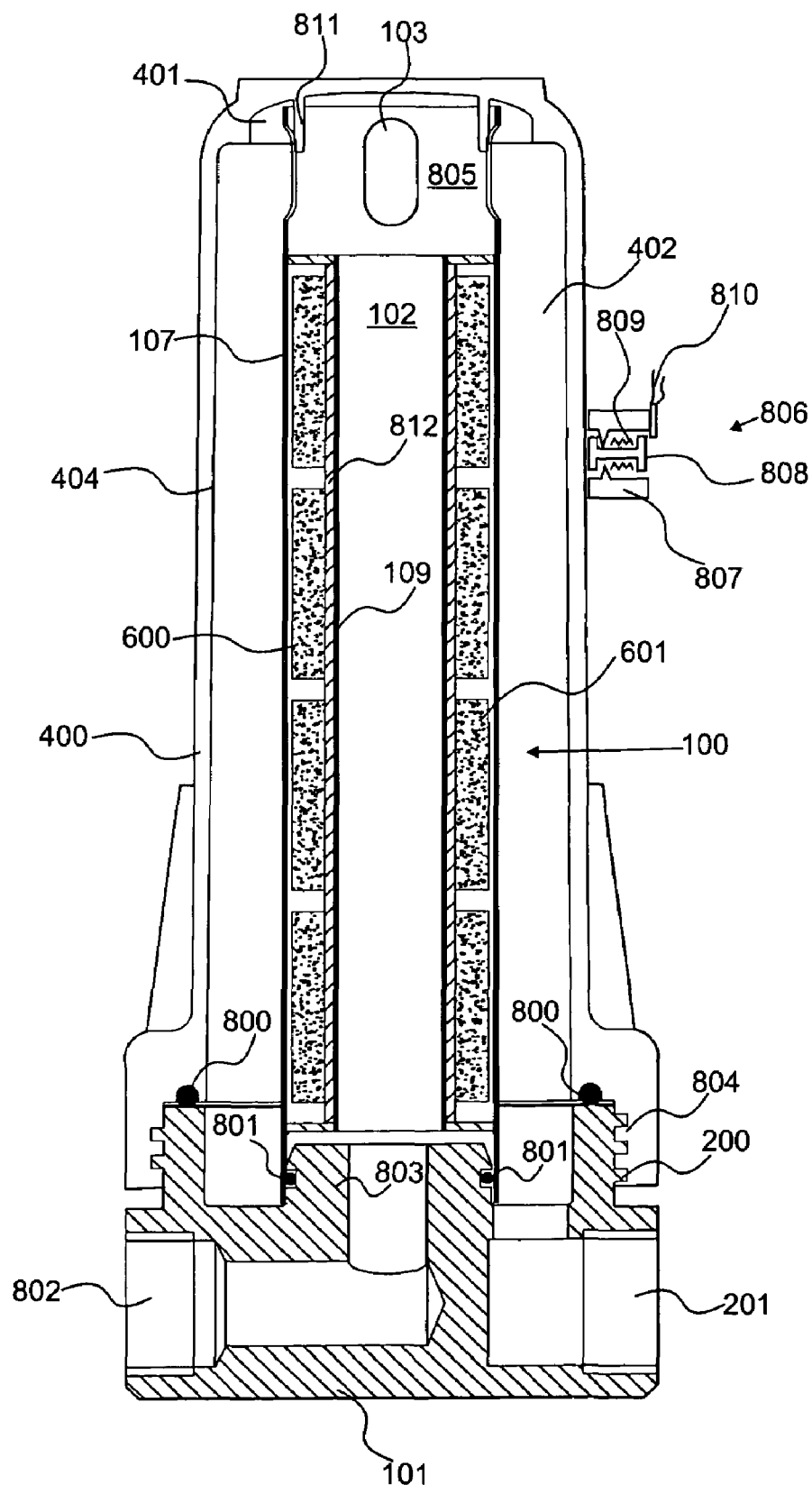
FIG. 8 is a cross sectional view of the magnetic filter device of FIGS. 4 and 5 further comprising a contaminant saturation indicator positioned on an outer surface of the outer case.
Figure 9:
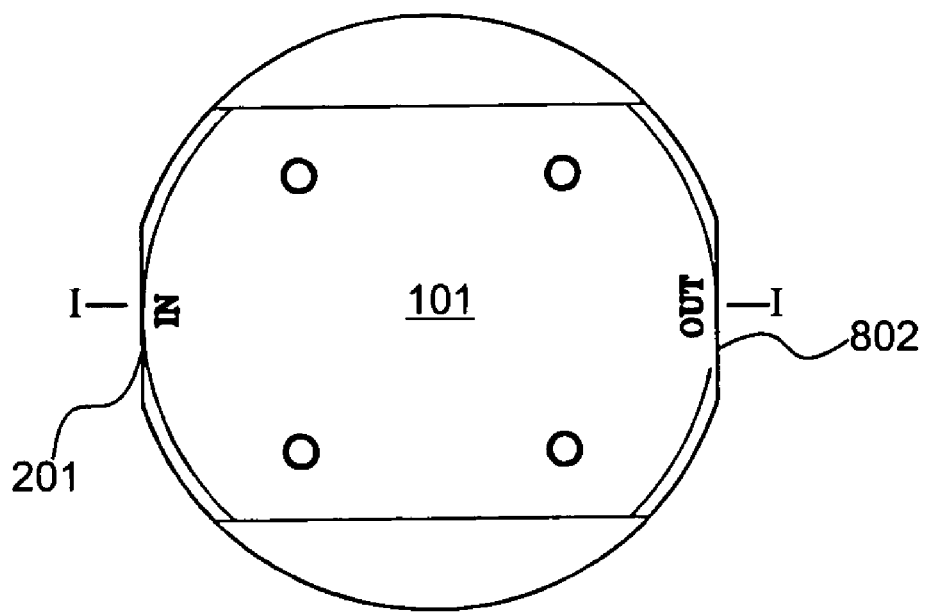
FIG. 9 is an underside view of the filter head of FIG. 1.

Referring to FIG. 8 the magnetic core 100 is secured in position within the filter at each end of its main length. A first end is secured to the filter head 101 via a relatively short abutment column 803 configured for positioning within a portion of the magnet core. Magnetic core 100 is sealed in fluid communication with filter head 101 via an o-ring 801 positioned at column 803 and in contact with an interior surface of outer sleeve 107. Magnetic core 100 is secured in position at its adjacent end by securing means 811 projecting from the internal surface 404 of the outer case 400 in the region of the recessed portion 401.

Magnetic keepering means 812 is positioned between inner stainless steel sleeve 109 and each of the four columns of magnets 600-603. Keepering means 812 is also provided at each end face of the cylindrical magnetic core. The magnetic keepering means functions to inhibit and preferably eliminate the magnetic field created by the magnets in the region beyond the ends of the magnet and within the internal passage 102.

A fluid tight seal is provided between outer case 400 and filter head 101 via the cooperating screw threads positioned towards one end of the filter head 200 and the outer case 804. An o-ring 800 is positioned in the region of the screw threads to provide a secure fluid tight seal between filter head 101 and outer case 400. Filter head comprises inlet 201 positioned in fluid communication with the exterior surface of the stainless steel outer sleeve 107 and the inner surface of the outer case 404 which define the contaminant catchment zone 402. Filter head 401 further comprises fluid outlet 802 provided in fluid communication with internal passage 102. Accordingly, in use fluid flows into the contaminant catchment zone 402 via inlet 201. O-ring 801 prevents fluid from passing directly from the inlet 201 to outlet 802. Similarly, o-ring 800 prevents the fluid from escaping out of the catchment zone 402. The fluid then flows through orifices 103 formed in the sleeve extension 805 and subsequently through internal passage 102 to exit the filter device via outlet 802.

The filtration device is fitted with a contaminant level monitoring device being responsive to the amount of contaminant deposited at the magnetic core. The contaminant saturation indicator 806 comprises a main body 807 housing a magnetic plunger 808 capable of shuttling backwards and forwards within a cavity formed within main body 807. Biasing means 809, in the form of a spring, is configured to positionally bias plunger 808 in a direction away from an outer surface of outer case 400 to which saturation indicator is secured. Electronic communication means 810, including electrical cabling, enables electronic signals to be transmitted to and from the indicator 806. For example, indicator 806 is connectable to a work or control station such that the relative position and movement of plunger 808, within main body 807, may be monitored from a remote location.

In operation, the magnetic field gradient generated by at least one column of magnets is of sufficient intensity and depth to overcome the biasing force exerted by spring 809 to draw the plunger 808 towards the magnetic core. As contaminant material is deposited at the outer surface of the magnetic core, the intensity of the magnetic field experienced by the plunger decreases. When a predetermined amount of contaminant is deposited at the magnetic core being positioned between indicator 806 and magnetic columns 600-603, the spring 809 forces the plunger in a direction away from the magnetic core. This plunger movement is detected electronically using conventional electrical components to be relayed to a work or control station. The amount of contaminant and importantly the point of contaminant saturation within the magnetic filter may therefore be monitored without resort to dismantling the filter and interrupting operation.

Figure 10:
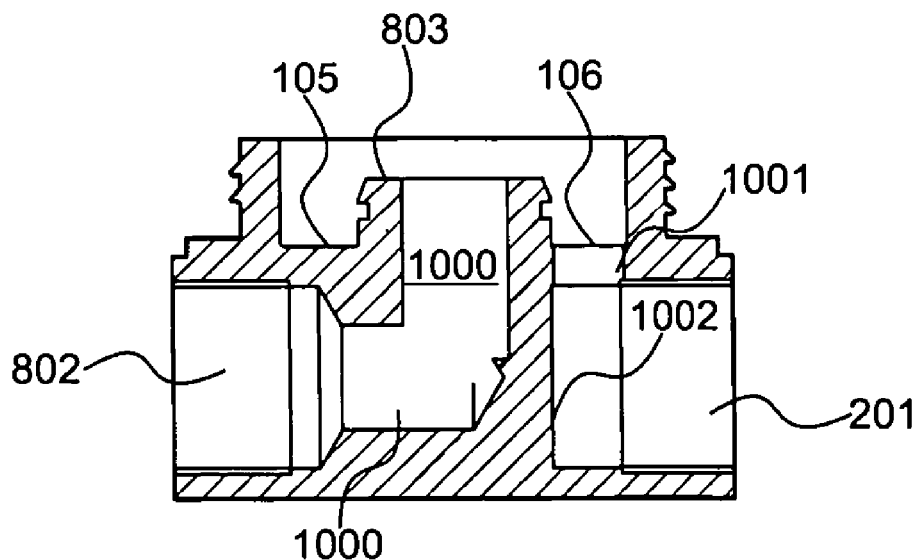
FIG. 10 is a cross sectional view of the filter head of FIG. 9 along the line I-I.
Figure 13:
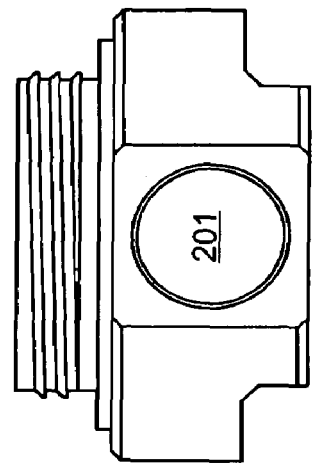
FIG. 13 is a side elevation view of the filter head of FIG. 12.
Figure 11:
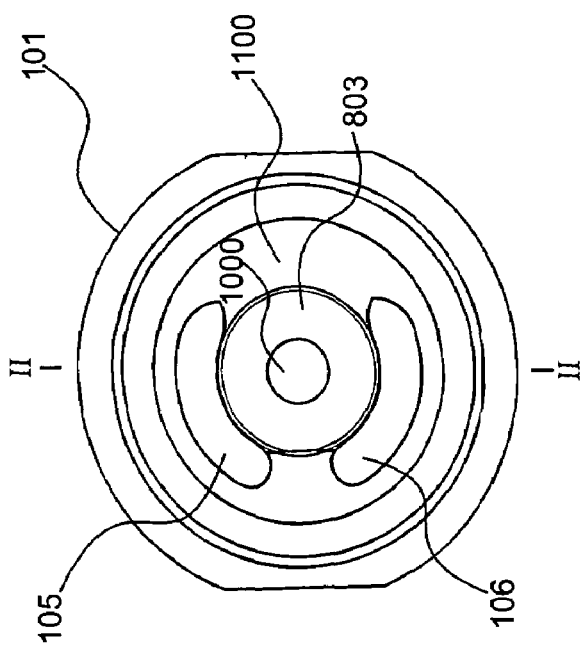
FIG. 11 is a plan view of the filter head of FIG. 10.
Figure 12:
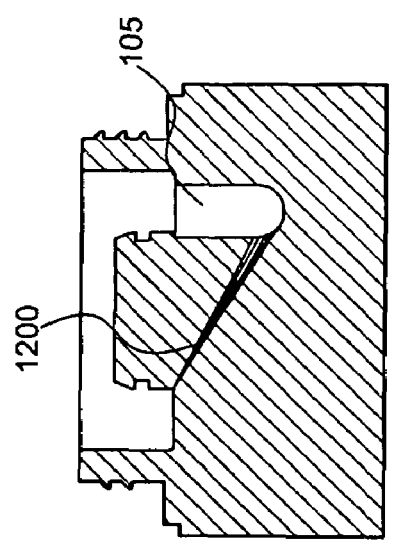
FIG. 12 is a cross sectional view of the filter head of FIG. 11 along line II-II.

The filter head is illustrated in FIGS. 9, 10, 11, 12 and 13. FIG. 10 illustrates the filter head through line I-I and FIG. 12 illustrates the filter head through line II-II. Fluid flowing into inlet 201 contacts diverting wall 1002 which serves to split the fluid inlet flow path and redirect the flow through directing ports 105, 106. Both directing ports are formed as elongate slots in an upper surface 1100 of the filter head which defines a portion of the contaminant catchment zone 402. The depth of each directing port shallows along their respective length from the diverting wall 1002 to a region furthest from this wall as illustrated by the incline 1200 of FIG. 12. The tapering flow path of the directing ports 105, 106 introduces the fluid along an inclined flow path away from internal surface 1100 into the catchment zone 402. As magnetic core 100 is positioned between inlet ports 105, 106 the fluid introduced into the catchment zone via port 105 flows around the central core in an anti clockwise direction whilst the second port 106 directs the fluid to flow in a clockwise direction around central core 100. Both ports introduce the fluid into the catchment zone with a flow path aligned transverse to the longitudinal axis of magnetic core 100. In use, the fluid flow paths from each directing port collide at a region within the catchment zone along the length of the magnetic core 100.

Figure 14:
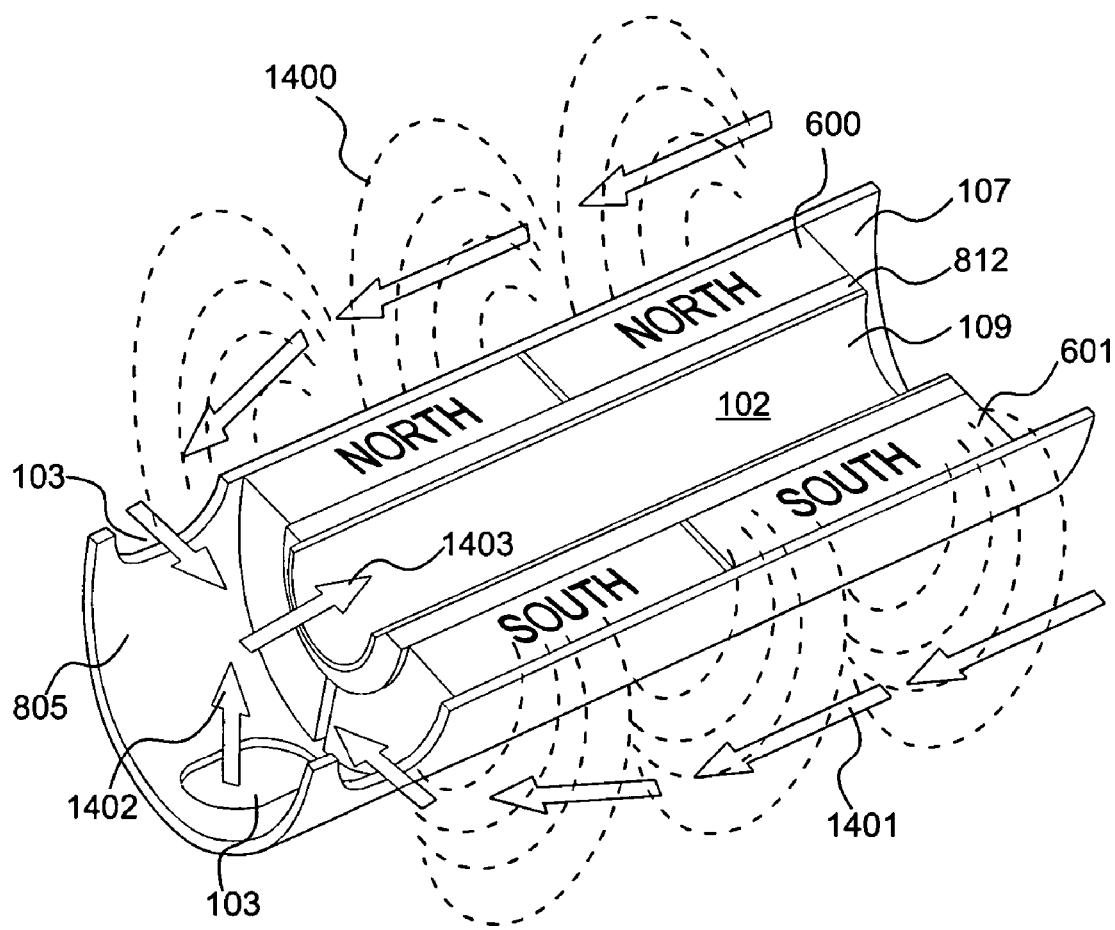
FIG. 14 is a schematic illustration of the flow of fluid over and through a portion of the magnetic core of the filter device of FIG. 8.
Figure 15:
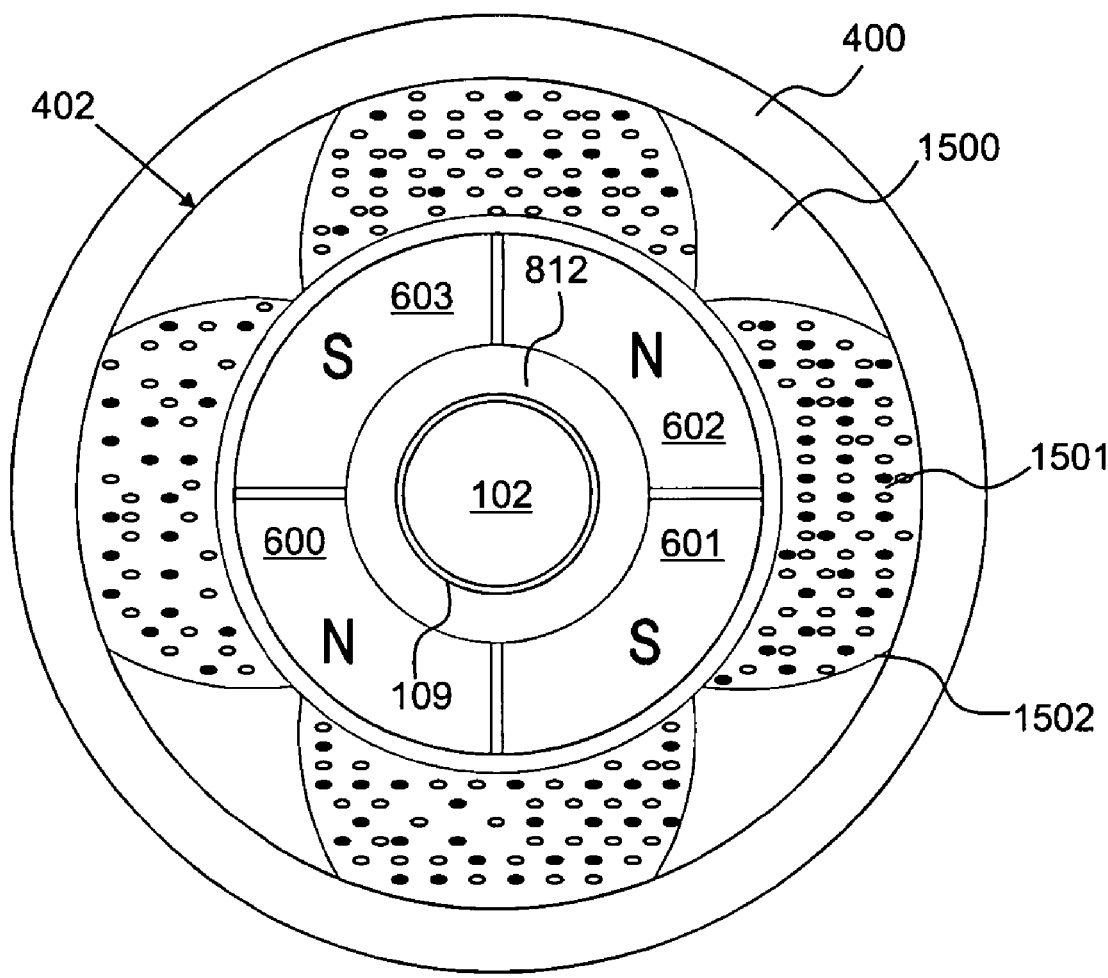
FIG. 15 is a cross-sectional view in the plane perpendicular to the longitudinal axis of the magnetic core with contaminant material deposited on the outer surface of the magnetic core.

In operation, the filter device is connected within a fluid circuit using suitable hosing interfacing with the inlet 201 and outlet 802. The contaminated fluid is directed into the catchment zone 402 via the directing ports 105, 106 to flow over the exterior surface of the magnetic core 1401 and through the magnetic field 1400 created by the array of magnetic elements as illustrated in FIGS. 14 and 15. The fluid 1402 flows through the orifices 103 formed in the sleeve extension 805 to begin the return flow path 1403 through inner passage 102.

With reference to FIG. 15, as the columns of magnets are arranged lengthways around the central longitudinal axis of the core in alternating north and south polarity the magnetic field intensity in the annular catchment zone 402 alternates from high to low so as to define four lobes of high intensity field 1502 and four intermediate spaced regions of low field intensity 1500. As the contaminant fluid passes through this profiled field gradient the suspended contaminant material is attracted through the fluid by the high attracted forces and is retained in one of the high field areas 1501. As the level of contaminant builds on outer surface 107, the areas of low field gradient 1500, exhibiting a reduced contaminant retention force, comprise a significantly reduced relative contaminant concentration as the contaminant migrates into the higher field areas 1502. This in turn produces the 'free flow path channels' 1500 in which the passage of fluid is not impeded by deposited contaminant.

At the contaminant saturation point, being the point at which the filter cannot separate further contaminant from the contaminated fluid, fluid continues to flow through the filter device unlike conventional magnetic filters which become blocked due to the continual build-up of contaminant.

By separating each column of magnets, distributed radially around the central longitudinal axis, by a predetermined distance, the magnetic core design serves to promote the controlled deposition of contaminant at discrete regions 1502 over the length of the external surface of magnet core 100. Moreover, the magnetic field circuit created by the array of magnets provides regions of low or reduced relative field intensity 1500 so as to ensure elongate regions of the catchment zone 402 never become blocked with separated contaminant material. Accordingly, fluid will continue to flow through the magnetic filter at and beyond the contaminant saturation point of the device thereby preventing machine damage.

By controlling the way in which the fluid is introduced into catchment zone 402 via directing ports 105, 106 the contaminant material is deposited evenly over outer surface 403 of the magnetic core 100.

Figure 16:
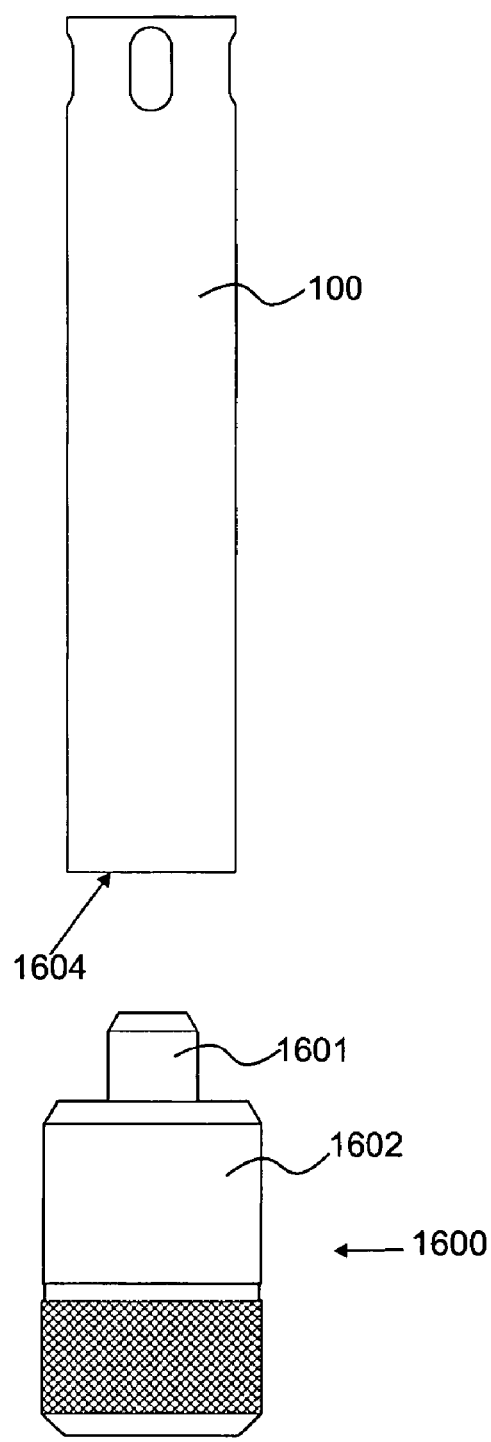
FIG. 16 is a side elevation view of the magnetic core of FIGS. 1 to 3 and a cleaning post upon which the magnetic core may be mounted.

Following saturated depositioning of contaminant at the magnetic core, the filter device requires cleaning to remove contaminant ready for continued use. The outer surface of the stainless steel sleeve 107 comprises a smooth, unprofiled finish enabling a user to easily wipe-off contaminant from exterior surface 403 using a cloth (not shown) or annular cleaning tool (not shown) which may be drawn over the exterior surface. To enable efficient cleaning the magnetic core is removed from the filter device and mounted upon a cleaning post 1600 as illustrated in FIG. 16. A portion of the substantially cylindrical cleaning post 1602 comprises a diameter being slightly less than the internal diameter of one end portion 1604 of the cylindrical outer sleeve 107. A cylindrical stub 1601 extending centrally from the cylindrical post 1602 comprises a diameter being slightly less than a diameter of the internal passage 102. Accordingly, central stub 1601 is capable of seating within passage 102 whilst a portion of the post 1602 seats within a portion of the outer sleeve 107. A user, holding a portion of the core 100 or post 1600 between the fingers, may then use an alternate hand to wipe deposited contaminant from the magnetic core 100.

The invention claimed is:

1. A magnetic filter device for separation of contaminant material from a fluid, said magnetic filter device comprising:
    an inlet to allow a fluid to flow into said magnetic filter device;
    an outlet to allow said fluid to flow out of said magnetic filter device; and
    an elongate magnetic core comprising at least four columns of magnets, at least two said columns having a north polarity extending substantially the length of said columns and at least two said columns having a south polarity extending substantially the length of said columns wherein said at least four columns are arranged lengthways around a central longitudinal axis of said core in alternating north and south polarity; and
    an outer case housing said magnetic core, said outer case being spaced apart from said magnetic core a distance sufficient to allow said fluid to flow therebetween.

2. The filter device as claimed in claim 1 further comprising an internal passage extending substantially the length of said magnetic core, said at least four columns arranged around said internal passage wherein said fluid is further capable of flowing through said internal passage.

3. The filter device as claimed in claim 2 further comprising magnetic keepering means positioned at said internal passage, said magnetic keepering means capable of inhibiting the magnetic field created by said at least four magnets within said internal passage.

4. The filter device as claimed in claim 2 further comprising an inner sleeve positioned at said internal passage.

5. The filter device as claimed in claim 1 further comprising an outer sleeve positioned over said at least four columns.

6. The filter device as claimed in claim 5 wherein said outer sleeve comprises a stainless steel material.

7. The filter device as claimed in claim 1 further comprising a filter head attached to said magnetic core, said filter head comprising said inlet.

8. The filter device as claimed in claim 7 wherein said filter head is removably attached to said magnetic core.

9. The filter device as claimed in claim 7 further comprising an o-ring positioned at the junction between said filter head and said magnetic core.

10. The filter device as claimed in claim 1 wherein said outer case comprises a transparent or translucent material.

11. The filter device as claimed in claim 1 further comprising an outer sleeve positioned over said at least four columns, said outer sleeve comprising an extension extending beyond an end of said at least four columns, said extension abutting an interior of said outer case and comprising at least one slot means to allow a flow of said fluid therethrough.

12. The filter device as claimed in claim 1 wherein said inlet is divided into a plurality of fluid directing ports, each of said plurality of ports configured to direct a flow of said fluid within said filter device in a direction transverse to said longitudinal axis of said core.

13. The filter device as claimed in claim 1 further comprising first and second fluid directing ports, said first and second ports in fluid communication with said inlet and configured such that a flow path of said fluid from said first port will collide with a flow path of said fluid from said second port at a position along the length of said magnetic core.

14. The filter device as claimed in claim 1 further comprising a contaminant saturation indicator secured to said outer case and configured to be responsive to an amount of said contaminant material that has been separated from said fluid and deposited on an outer surface of said magnetic core.

15. The filter device as claimed in claim 1 wherein said magnetic core comprises a cylindrical geometry.

16. The filter device as claimed in claim 1 wherein said magnetic core comprises a smooth external surface.

17. A method of filtering contaminant material from a fluid, said method comprising:
    allowing fluid to flow into a magnetic filter via a fluid inlet;
    allowing said fluid to flow between an outer case housing an elongate magnetic core, spaced apart therefrom, and said magnetic core, said magnetic core comprising at least four columns of magnets, at least two said columns having a north polarity extending substantially the length of said columns and at least two said columns having a south polarity extending substantially the length of said columns wherein said at least four columns are arranged lengthways around a central longitudinal axis of said core in alternating north and south polarity whereby an amount of said contaminant material separates from said fluid and deposits on said magnetic core; and
    allowing said fluid to flow out of said magnetic filter via a fluid outlet.

18. The method as claimed in claim 17 further comprising directing the flow of fluid from said inlet to said outlet via an internal passage extending within and substantially the length of said magnetic core.

19. The method as claimed in claim 18 further comprising inhibiting the magnetic field created by said at least four columns of magnets in the region of said internal passage using magnetic keepering means positioned at said internal passage.

20. The method as claimed in claim 17 further comprising:
    directing a flow of said fluid over an outer surface of said magnetic core;
    allowing said contaminant material to be deposited at said outer surface of said magnetic core;
    allowing said fluid to flow through an internal passage extending within and substantially the length of said magnetic core; and
    allowing said fluid to flow out of said filter device via an outlet positioned adjacent said internal passage.

21. The method as claimed in claim 17 further comprising directing said fluid over said magnetic core via a plurality of fluid directing ports configured to create turbulence in said fluid over said magnetic core.

22. The method as claimed in claim 17 further comprising allowing said contaminant material to be deposited on an outer sleeve positioned over said at least four columns of magnets.

23. The method as claimed in claim 17 further comprising monitoring said amount of said contaminant material deposited at said magnetic core using a contaminant saturation indicator.

24. A kit of parts for a magnetic filter device comprising:
    an elongate magnetic core comprising at least four columns of magnets, at least two said columns having a north polarity extending substantially the length of said columns and at least two said columns having a south polarity extending substantially the length of said columns wherein said at least four columns are arranged lengthways around a central longitudinal axis of said core in alternating north and south polarity;
    a filter head comprising an inlet and an outlet, said filter head capable of being removably attached to said magnetic core; and
    an outer case configured to seat against said filter head and encase said magnetic core, said outer case being spaced apart from said magnetic core a distance sufficient to allow said fluid to flow therebetween.

25. The kit of parts as claimed in claim 24 wherein said magnetic core comprises an internal passage extending substantially the length of said at least four columns of magnets.

26. The kit of parts as claimed in claim 24 further comprising a contaminant material saturation indicator configured to monitor an amount of said contaminant material deposited on said magnetic core.

27. The kit of parts as claimed in claim 24 further comprising a cleaning post, a portion of said post comprising an exterior profile corresponding to that of a portion of said magnetic core, said portion of said cleaning post configured to mate in contact with said portion of said magnetic core.

28. The kit of parts as claimed in claim 24 further comprising a cleaning tray configured to receive said contaminant material deposited and removed from said magnetic core.

* * * * *